(12) United States Patent
Kim et al.

(10) Patent No.: US 12,519,118 B2
(45) Date of Patent: Jan. 6, 2026

(54) METHOD FOR DIAGNOSING VALVE FAILURE OF FUEL CELL SYSTEM

(71) Applicants: Hyundai Motor Company, Seoul (KR); Kia Corporation, Seoul (KR)

(72) Inventors: Mi Sun Kim, Gyeonggi-do (KR); Dong Hun Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 599 days.

(21) Appl. No.: 18/080,438

(22) Filed: Dec. 13, 2022

(65) Prior Publication Data

US 2023/0187667 A1      Jun. 15, 2023

(30) Foreign Application Priority Data

Dec. 15, 2021    (KR) .................. 10-2021-0179361

(51) Int. Cl.
| | |
|---|---|
| *H01M 8/04664* | (2016.01) |
| *H01M 8/04082* | (2016.01) |
| *H01M 8/04089* | (2016.01) |
| *H01M 8/04291* | (2016.01) |
| *H01M 8/0438*  | (2016.01) |

(52) U.S. Cl.
CPC ... *H01M 8/04686* (2013.01); *H01M 8/04104* (2013.01); *H01M 8/04201* (2013.01); *H01M 8/04291* (2013.01); *H01M 8/04388* (2013.01); *H01M 2250/20* (2013.01)

(58) Field of Classification Search
CPC ......... H01M 8/04686; H01M 8/04388; H01M 8/04291; H01M 8/04201; H01M 8/04104
See application file for complete search history.

(56) References Cited

FOREIGN PATENT DOCUMENTS

KR        101788201 B1    10/2017

*Primary Examiner* — Sarah A. Slifka
(74) *Attorney, Agent, or Firm* — Fox Rothschild LLP

(57) ABSTRACT

A method for diagnosing valve failure of a fuel cell system is proposed. The method comprises determining failure diagnosis target pressure from atmospheric pressure that is a real-time sensing value of an atmospheric sensor by means of a controller, controlling opening of a fuel supply valve installed in a hydrogen supply line such that stack anode-side pressure reaches the determined failure diagnosis target pressure by means of the controller, performing control for opening an integrated discharge valve installed at a water trap when the stack anode-side pressure reaches the failure diagnosis target pressure, counting a time passed after the opening, and determining whether the integrated discharge valve fails based on the time, the stack anode-side pressure, and the atmospheric pressure.

16 Claims, 6 Drawing Sheets

METHOD FOR DIAGNOSING VALVE FAILURE OF FUEL CELL SYSTEM

CROSS REFERENCE TO RELATED APPLICATION(S)

This application claims, under 35 U.S.C. § 119(a), the benefit of Korean Patent Application No. 10-2021-0179361, filed on Dec. 15, 2021, the disclosure of which is incorporated herein by reference in its entirety.

BACKGROUND

Technical Field

Embodiments of the present disclosure relate to a method for diagnosing valve failure of a fuel cell system and, more particularly, to a method for diagnosing whether a valve of a fuel cell system fails in a direct way of using a sensor.

Background

A fuel cell system that is mounted on a hydrogen fuel cell vehicle that is an eco-friendly vehicle may comprise a fuel cell stack that produces electrochemical energy using an electrochemical reaction of reaction gases (i.e., hydrogen that is a fuel gas and oxygen that is an oxidizer gas), a hydrogen supplier that supplies hydrogen, which is a fuel gas, to the fuel cell stack, an air supplier that supplies air containing hydrogen to the fuel cell stack, a heat-water management system that controls operation temperature of the fuel cell stack and manages water, and a controller that generally controls operation of the fuel cell system.

The hydrogen supplier of the fuel cell system may comprise a hydrogen storage (hydrogen tank), a hydrogen supply line, a fuel shutoff valve, a fuel supply valve, a pressure sensor, a hydrogen recirculator, etc. The air supplier may comprise an air supply line, an air blower or an air compressor, a humidifier, an air shutoff valve, etc., and the heat-water management system may comprise an electric water pump (cooling water pump), a reservoir tank, a radiator, a 3-way valve, a water trap, a discharge valve, etc.

The controller (Fuel cell Controller (FCU)) controls driving of the air compressor or air blower, and the electric water pump, controls hydrogen supply pressure by controlling opening of the fuel supply valve, and controls valves in the system.

Non-reacting hydrogen left after a reaction in the fuel cell stack may be discharged to the outside through an anode (hydrogen electrode, fuel electrode) outlet terminal or may be recirculated to an anode inlet terminal of the fuel cell stack by the hydrogen recirculator.

The hydrogen recirculator, which may be provided to reuse non-reacting hydrogen, may comprise a recirculation line connected from an anode-side exhaust line of the fuel cell stack to an anode inlet-side hydrogen supply line. The hydrogen recirculator may comprise an ejector or a recirculation blower that suctions non-reacting hydrogen in the exhaust lien through the recirculation line and supplies the non-reacting hydrogen to the fuel cell stack through the hydrogen supply line, or may comprise the ejector and the recirculation blower.

A purge valve for anode-side purge may be installed in the anode-side exhaust line of the fuel cell stack. Foreign substances such as nitrogen and water are discharged and removed together with hydrogen from the anode of the fuel cell stack by periodically opening and closing the purge valve, thereby increasing a hydrogen utilization rate.

Water may be discharged together with non-reacting hydrogen from the fuel cell stack through the exhaust line connected to the anode outlet and the non-reacting hydrogen may be recirculated to the fuel cell stack by the hydrogen recirculator. Water may be discharged from the fuel cell stack to the anode-side exhaust line and then stored in the water trap. The level of water in the water trap may be sensed by a water level sensor, and when the level of water in the water trap increases over a predetermined level, a discharge valve at an outlet may be opened and water may be drained.

An integrated discharge valve that integrally performs a water drain function and a purge function may be installed at the outlet of the water trap in the fuel cell system. The integrated discharge valve opens or closes one passage so that water and gas are discharged through the passage. In this case, water in the water trap may be drained first through the integrated discharge valve, and when water is completely drained, purge for discharging gas containing impurities such as nitrogen together with hydrogen may be performed. Whether water has been completely drained can be determined through the water level sensor.

Meanwhile, a solenoid valve type may be used as the integrated discharge valve, but such a solenoid valve-type integrated discharge valve has no means for directly checking whether the valve has been actually opened or closed in accordance with opening and closing instructions. However, since water is drained and then gas is discharged for the characteristics of the integrated discharge valve when the integrated discharge valve is opened, a method of indirectly check whether the valve has been opened or closed on the basis of an anode gas discharge amount (a purge amount calculation value) may be applied.

If there is no anode gas discharge amount even though a predetermined time has passed after the valve is instructed to open, the fuel cell system may be shut down to protect the fuel cell stack. FIG. 1 is a flowchart showing this process.

As shown in the figure, after the fuel cell system is started (S1), if the hydrogen concentration at the anode of the stack is low or the water trap is fully filled with water up to the full level in step S2, the integrated discharge valve may be controlled to be opened so that the water in the water trap is drained and purge is performed (gas is discharged). In this case, the controller outputs an opening instruction for opening the integrated discharge valve (S3).

The anode-side gas discharge amount of the stack and a set value $\lambda$ are compared with an instruction to open the integrated discharge valve output (S4), and when the anode-side gas discharge amount exceeds the set value $\lambda$, an instruction to shut off the integrated discharge valve may be output, whereby water drain and purging are stopped (S5). If gas is not discharged and it is determined that water drain and purging are impossible, the fuel cell system may be immediately shut down (S6), thereby preventing deterioration of durability of the stack due to reduction of hydrogen concentration and flooding at the anode.

Since a means, such as a sensor that makes it possible to directly check whether a valve is actually opened or closed, is not provided for the solenoid valve-type integrated discharge valve, as described above, whether the valve is opened or closed and fails may be indirectly determined by calculating the anode-side gas discharge amount (purge amount).

It may be possible to mount a means that makes it possible to directly check the opening/closing states of the solenoid valve-type integrated discharge valve, such as a position sensor that senses the position of an opening/closing means or a current sensor, but these sensors are difficult to mount, have low sensing performance, and have a problem with reliability, so they cannot be used.

That is, it is almost impossible to mount a position sensor due to structural problems for the characteristics of the integrated discharge valve, and the position sensor cannot sense a position (not reliable) because a current variation is too small when the valve is operated. As for a current sensor, since it is required to read current waves of the unit of µs, the resources of a controller increase, valves have differences, and waveforms may vary in accordance with input power, so the sensing performance is poor and reliability in diagnosis may be difficult to secure.

Further, as described above, since a direct means (a sensor, etc.) that makes it possible to directly check whether the solenoid valve-type integrated discharge valve is opened or closed, whether the valve is opened or closed may be indirectly determined on the basis of an anode-side gas discharge amount (purge amount, a calculated value).

If it is possible to definitely know whether a valve is opened or closed even though the function of calculating an anode-side gas discharge amount (purge amount) does not work, coulomb counting-based fixed-time purge (emergency operation) may be possible. However, when the function of calculating a gas discharge amount (purge amount) does not work, it may be impossible to now to check whether the valve is opened or closed, so there is a problem that the fuel cell system should be immediately shut down without emergency operation.

SUMMARY

Accordingly, the present disclosure has been made in an effort to solve the problems described above and an objective of the present disclosure is to provide a diagnosis method that can diagnose and determine whether an integrated discharge valve is opened or closed and fails in a direct way of using a sensor, etc. rather than indirectly checking and diagnosing whether an integrated discharge valve is opened or closed, as the related art.

The objectives of the present disclosure are not limited to those described above and other objectives not stated herein would be apparently understood by those who have ordinary skills in the art that the present disclosure belongs to (hereafter, 'those skilled in the art') from the following description.

In order to achieve the objectives, an exemplary embodiment of the present disclosure provides a method for diagnosing valve failure of a fuel cell system, the method comprising: determining failure diagnosis target pressure from atmospheric pressure that is a real-time sensing value of an atmospheric sensor by means of a controller; controlling opening of a fuel supply valve installed in a hydrogen supply line such that stack anode-side pressure reaches the determined failure diagnosis target pressure by means of the controller; performing control for opening an integrated discharge valve installed at a water trap and counting a time from the control for opening by means of the controller when the stack anode-side pressure reaches the failure diagnosis target pressure; and determining whether the integrated discharge valve fails on the basis of the time counted after the integrated discharge valve is opened, the stack anode-side pressure, and the atmospheric pressure that is the real-time sensing value by means of the controller.

The controller may determine whether a preset failure diagnosis entrance condition is satisfied from current operation state information of the fuel cell system, and the controller may determine the failure diagnosis target pressure when determining that the failure diagnosis entrance condition is satisfied.

The failure diagnosis entrance condition may be a condition in which only hydrogen is supplied to an anode of a fuel cell stack without current output from the fuel cell stack, and the failure diagnosis entrance condition may comprise one or more of a state before air is supplied to the fuel cell stack when the fuel cell system is being started, a state after air that is supplied to the fuel cell stack is stopped when the fuel cell system is being stopped, a state after air that is supplied to the fuel cell stack is stopped/blocked when a fuel cell stop is being entered, and a state before air is supplied to the fuel cell stack when the fuel cell stop is being exited.

The controller may be set check whether an air shutoff valve installed in a cathode inlet-side air supply lien of a fuel cell stack and a cathode outlet-side exhaust line of the fuel cell stack is closed when determining that the failure diagnosis entrance condition is satisfied, and to determine the failure diagnosis target pressure with the air supply line and the exhaust line closed by the air shutoff valve.

In determining of the failure diagnosis target pressure, the failure diagnosis target pressure may be determined as the sum of atmospheric pressure, which is a sensing value of the atmospheric pressure sensor, and a preset set value.

The set value may be a value determined as a constant through a test and stored in the controller, or, in the determining of the failure diagnosis target pressure, the set value may be a value determined in advance through a test and may be determined as a value according to the stack anode-side pressure.

The determining of whether the integrated discharge valve fails may comprise: determining a drain completion time according to a current water level in a water trap on the basis of information of a water level in the water trap under a condition of a fixed pressure difference; determining a failure diagnosis reference time from the determined drain completion time and a preset post-drain anode-side pressure stabilization time; determining whether the counted time exceeds the determined failure diagnosis reference time; and finally determining whether the integrated discharge valve fails by comparing the stack anode-side pressure and atmospheric pressure that is the real-time sensing value when determining that the counted time exceeds the failure diagnosis reference time.

The controller may be set to determine a drain completion time corresponding to a current water level in the water trap from a map or a table corresponding to set data that are input and stored in advance.

The controller may be set to determine the failure diagnosis reference time as the sum of the determined drain completion time and the post-drain anode-side pressure stabilization time in the determining of a failure diagnosis reference time.

In the determining of whether the integrated discharge valve fails, the controller may determine that the integrated discharge valve is in a closed-stuck failure state in which the integrated discharge valve keeps closed without opening when the stack anode-side pressure is larger than atmospheric pressure that is the real-time sensing value.

In the determining of whether the integrated discharge valve fails, the controller may determine that the integrated discharge valve is in a normal state when the stack anode-side pressure is the same as atmospheric pressure that is the real-time sensing value.

The determining of whether the integrated discharge valve fails may comprise: determining a failure diagnosis reference time from a drain completion time, which is set in advance as a constant, and a post-drain anode-side pressure stabilization time; determining whether the counted time exceeds the determined failure diagnosis reference time; and finally determining whether the integrated discharge valve fails by comparing the stack anode-side pressure and atmospheric pressure that is the real-time sensing value when determining that the counted time exceeds the failure diagnosis reference time.

The controller may be set to determine the failure diagnosis reference time as the sum of the drain completion time and the post-drain anode-side pressure stabilization time in the determining of a failure diagnosis reference time.

According to the method for diagnosing valve failure of a fuel cell system of the present disclosure, there are the following effects.

In the related art, since only a possible failure state of a valve is determined on the basis of an anode-side gas discharge amount (purge amount) of a fuel cell stack and a fuel cell system is shut down, it is difficult to avoid reduction of the power performance and an operation impossibility situation of a vehicle.

However, in the present disclosure, since it is possible to accurately diagnose a valve stuck failure, it is possible to shut down the fuel cell system only when failure is definitely determined, and accordingly, it is possible to prevent anode gas discharge amount of a vehicle and secure driving stability.

Further, when a position sensor or a current sensor for sensing whether a valve is opened or closed, there is a high possibility of wrong diagnosis due to low reliability of the sensors. However, in the present disclosure, since a position sensor or a current sensor is not used, there is an effect that it is possible to avoid the possibility of wrong diagnosis and to reduce the manufacturing cost.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1:
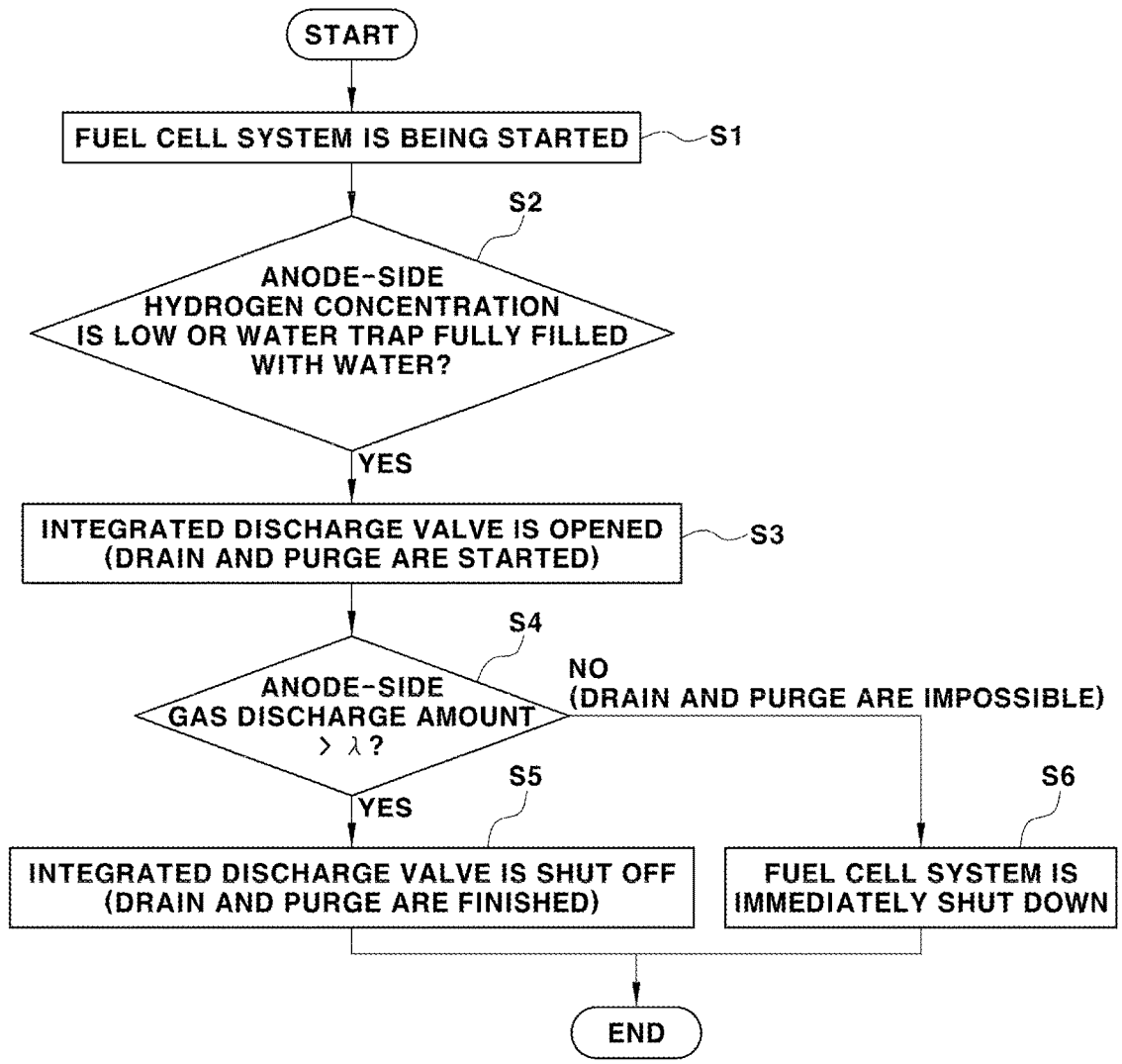
FIG. 1 is a flowchart showing a diagnosis process and a process of shutting down a fuel cell system in the related art.

Description of specific structures and functions disclosed in embodiments of the present disclosure are only an example for describing the embodiments according to the concept of the present disclosure and the embodiments according to the concept of the present disclosure may be implemented in various ways. The present disclosure is not limited to the embodiments described herein and should be construed as including all changes, equivalents, and replacements that are included in the spirit and the range of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

The present disclosure relates to a failure diagnosis method that can diagnose failure of a valve of a fuel cell system. In detail, the present disclosure relates to a diagnosis method that can diagnose and determine whether a valve is opened or closed and fails in a direct way of using a sensor, etc. rather than directly checking and diagnosing whether a valve is opened or closed, as the related art.

In the present disclosure, pressure sensors, that is, a stack inlet pressure sensor and an atmospheric pressure sensor are used, as will be described above, to directly diagnosis whether there is failure. Further, in the present disclosure, it is possible to diagnose and determine a failure state in which a valve is not actually normally opened, that is, a closed stuck failure state in which a valve keeps closed without opening although the valve has been controlled to open, using the pressure sensors.

A valve that is a failure diagnosis target in the present disclosure may be an integrated discharge valve that is installed at the outlet of a water trap and integrally performs a water drain function and a purge function. In detail, the valve that is a failure diagnosis target in the present disclosure may be a normal closed-type integrated discharge valve.

Embodiments of the present disclosure will be described hereafter in detail with reference to the accompanying drawings.

Figure 2:
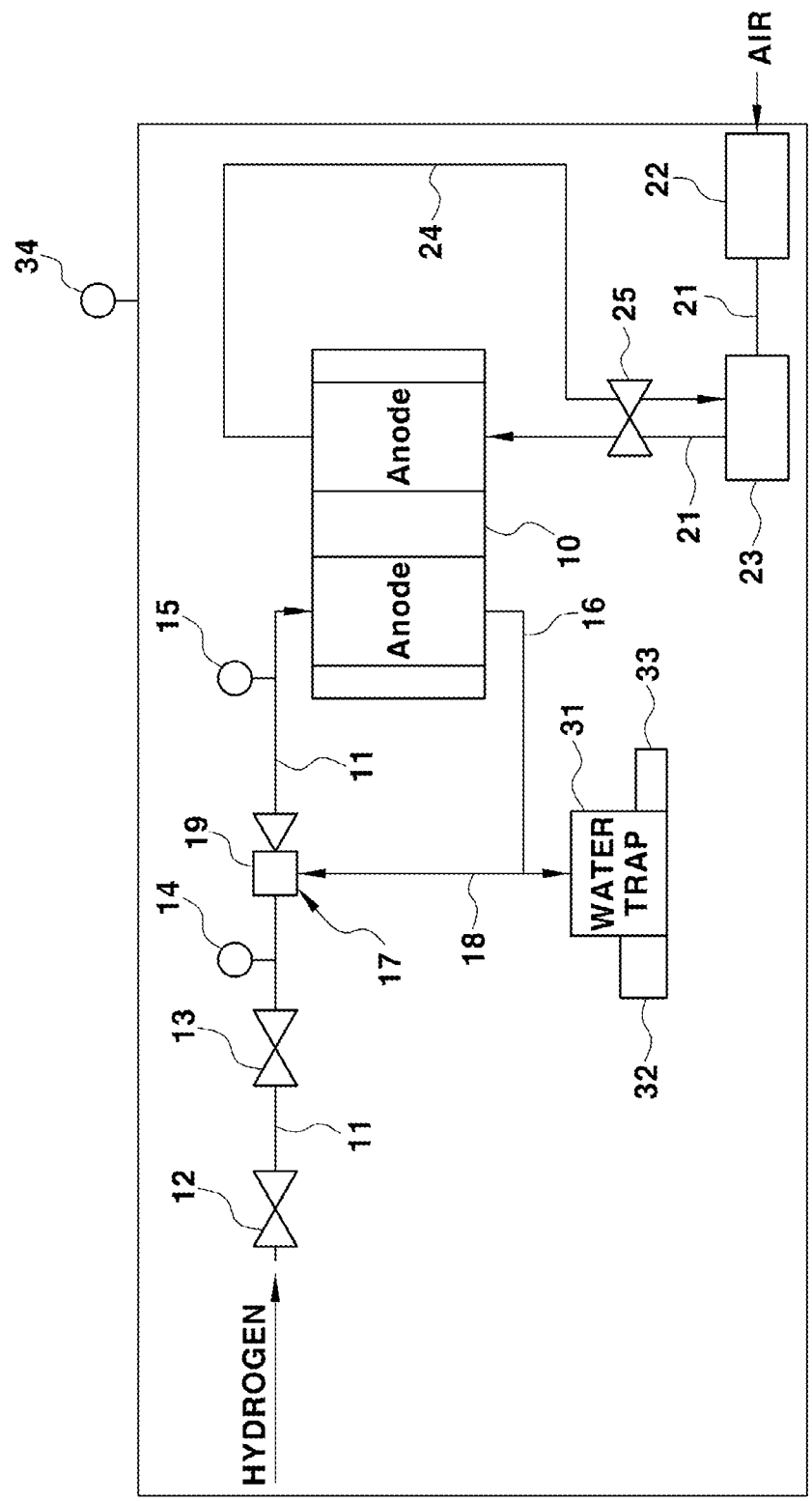
FIG. 2 is a diagram showing the configuration of an integrated discharge valve, which is a failure diagnosis target according to the present disclosure, and a fuel cell system comprising the integrated discharge valve.
Figure 3:
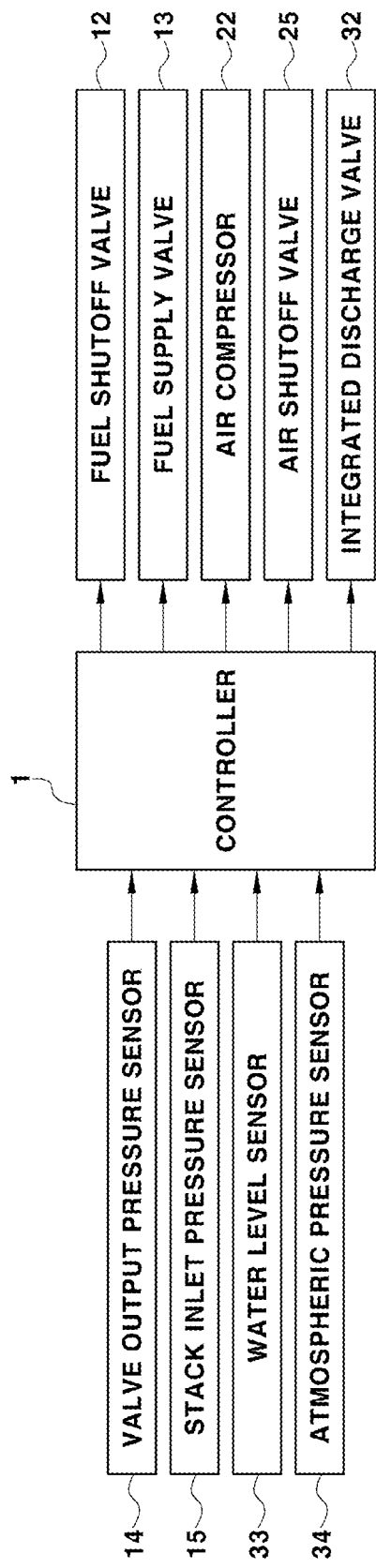
FIG. 3 is a block diagram showing sensor, a controller, and operation elements in a fuel cell system to which the failure diagnosis method according to the present disclosure is applied.

FIG. 2 is a diagram showing a configuration of an integrated discharge valve, which is a failure diagnosis target according to the present disclosure, and a fuel cell system comprising the integrated discharge valve, and FIG. 3 is a block diagram showing a sensor, a controller, and operation elements in a fuel cell system to which the failure diagnosis method according to the present disclosure may be applied.

A fuel cell system may comprise a fuel cell stack 10 configured to produce electrochemical energy using an electrochemical reaction of reaction gases (i.e., hydrogen that is a fuel gas and oxygen that is an oxidizer gas), a hydrogen supplier configured to supply hydrogen, which is a fuel gas, to the fuel cell stack 10, an air supplier configured to supply air containing hydrogen to the fuel cell stack 10, a heat-water management system configured to control operation temperature of the fuel cell stack 10 and manage water, and a controller 1 that may generally be configured to control operation of the fuel cell system.

In the fuel cell system, the hydrogen supplier may comprise a hydrogen storage (hydrogen tank) (not shown), a hydrogen supply line 11, a fuel shutoff valve 12, a fuel supply valve 13, a valve outlet pressure sensor 14, a stack inlet pressure sensor 15, a hydrogen recirculator 17, etc. The valve outlet pressure sensor 14 may be installed in the hydrogen supply line 11 at an outlet of the fuel supply valve 13 and an inlet of an ejector 19, and the stack inlet pressure sensor 15 may be installed in the hydrogen supply line 11 at an anode inlet of the fuel cell stack 10.

The hydrogen recirculator 17, which is provided to reuse non-reacting hydrogen, may comprise a recirculation line 18 connected from an anode-side exhaust line 16 of the fuel cell stack 10 to the hydrogen supply line 11 at the anode inlet. The hydrogen recirculator 17 may comprise an ejector 19 configured to suction non-reacting hydrogen through the recirculation line 18 and supply the non-reacting hydrogen to the fuel cell stack 10 through the hydrogen supply line 11.

The air supplier may comprise an air supply line 21, an air compressor 22, a humidifier 23, an air shutoff valve 25, etc., and the heat-water management system may comprise an electric water pump (cooling water pump), a reservoir tank, a radiator, and a 3-way valve, which are not shown, a water trap 31, an integrated discharge valve 32, etc.

The controller 1 (Fuel cell Controller) may be configured to control driving of the air compressor 22 and the electric water pump (not shown), may be configured to control hydrogen supply pressure and stack anode-side pressure by controlling opening of the fuel supply valve 13, and may be configured to control other valves in the system such as the fuel shutoff valve 12, the air shutoff valve 25, and the integrated discharge valve 32.

In the system comprising a water level sensor configured to sense the level of water in the water trap, the controller 1 may be configured to obtain water level information in the water trap 31 from a signal from the water level sensor 33. Sensing information of the stack inlet pressure sensor 15 and sensing information of an atmospheric pressure sensor 34 configured to sense the atmospheric pressure may be used to diagnose failure of the integrated discharge valve 32 according to the present disclosure.

Referring to FIG. 2, the water trap 31 may be installed in the anode-side exhaust line 16 of the fuel cell stack 10 and the integrated discharge valve 32 may be installed at the inlet of the water trap 31. The air compressor 22 and the humidifier 23 may be disposed in the air supply line 21 at the inlet of the cathode of the fuel cell stack 10, and the air shutoff valve 25 may be installed in the air supply line 21 and the cathode-side exhaust line 24 at the downstream side of the humidifier 23.

Stack supply air may be humidified in the humidifier 23 by moisture exchange between air supplied by the air compressor 22 and air discharged to the exhaust line 24 from the cathode of the fuel cell stack 10. The air shutoff valve 25 may be provided and configured to selectively open and close the channels of the cathode inlet-side air supply line 21 and the cathode-side exhaust line 24 of the fuel cell stack 1.

In the fuel cell system shown in FIG. 2, stack anode-side pressure may be controlled with the cathode inlet and outlet of the fuel cell stack 10 shut off by the air shutoff valve 25 under the condition that current (output) does not come out from of the fuel cell stack 10 (that is, power is not generated).

In the present disclosure, a failure diagnosis mode may be entered with the cathode inlet and outlet of the fuel cell stack 10 shut off, and the controller 1 may be configured to control the fuel supply valve 13 with the fuel shutoff valve 12 shut off such that the stack anode-side pressure shows a set pressure difference a from the atmospheric pressure using hydrogen remaining in the hydrogen supply channel.

When failure is diagnosed, the controller 1 may be configured to output an instruction to open the integrated discharge valve 32, and may be configured to determine a normal state, in which the integrated discharge valve 32 is normally open, when the stack anode-side pressure becomes the same as the atmospheric pressure after a predetermined time passes, and may be configured to determine a closed-stuck failure state, in which the integrated discharge valve 32 is closed without opening, when the stack anode-side pressure is maintained higher than the atmospheric pressure.

Figure 4:
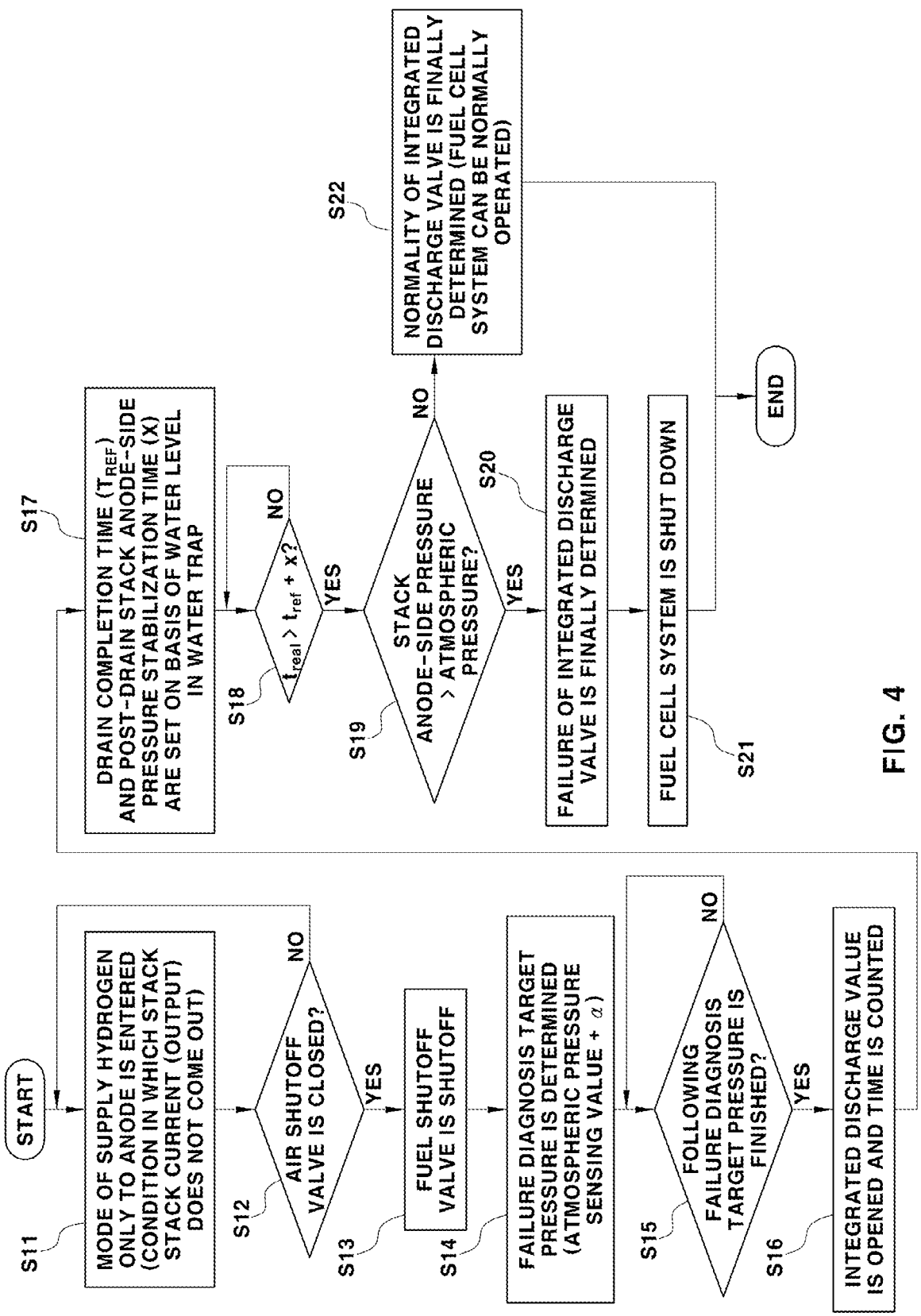
FIG. 4 is a flowchart showing a failure diagnosis process of an integrated discharge valve according to an exemplary embodiment of the present disclosure.

FIG. 4 is a flowchart showing a failure diagnosis process of an integrated discharge valve according to an exemplary embodiment of the present disclosure. A failure diagnosis process according to an exemplary embodiment of the present disclosure is described in more detail with reference to FIG. 4.

A process of diagnosing failure of the integrated discharge valve 32 may be performed by the controller 1 on the basis of various items of real-time information that are collected from a vehicle. In the present disclosure, the process of diagnosing failure of the integrated discharge valve 32 may be performed in a predetermined operation state and operation mode of the fuel cell system, and for this purpose, a failure diagnosis entrance condition that is determined on the basis of operation state information of the fuel cell system may be set in advance by the controller 1.

First, the controller 1 may be configured to determine whether a pre-set failure diagnosis entrance condition is satisfied. To this end, the controller 1 may be configured to collect real-time operation state information of the fuel cell system and may be configured to determine whether the pre-set failure diagnosis entrance condition is satisfied on the basis of the collected current operation state information.

In the present disclosure, a condition in which only hydrogen is supplied to the anode of the fuel cell stack 10 without current (output) coming out from the fuel cell stack 10 (that is, without power generated) may be set as the failure diagnosis entrance condition set in the controller 1.

In an exemplary embodiment of the present disclosure, the failure diagnosis entrance condition may comprise one or more of a state before air is supplied to the fuel cell stack 10 when the fuel cell system is being started, a state after air that is supplied to the fuel cell stack is stopped when the fuel cell system is being stopped, a state after air that is supplied to the fuel cell stack 10 is stopped when a fuel cell stop is being entered, and a state before air is supplied to the fuel cell stack 10 when the fuel cell stop is being exited.

In particular, these states are states in which the air shutoff valve 25 is shutoff and the cathode inlet and outlet of the fuel cell stack 10 are closed by the air shutoff valve 25. That is, failure diagnosis according to the present disclosure may be performed with the air shutoff valve 25 closed.

As shown in FIG. 2, since the air shutoff valve 25 is installed in the cathode inlet-side air supply line 21 and the cathode-side exhaust line 24 of the fuel cell stack 10, when the air shutoff valve 25 is closed, the cathode inlet-side air supply line 21 and the cathode-side exhaust line 24 may be closed and both the cathode inlet and outlet of the fuel cell stack 10 may be closed.

When the fuel cell system satisfies the failure diagnosis entrance condition, the controller 1 may be configured to check whether the air shutoff valve 25 is closed (S12) and then may be configured to enter the failure diagnosis mode for diagnosing failure of the integrated discharge valve 32 with the air shutoff valve 25 closed.

When entering the failure diagnosis mode, the controller 1 may be configured to close (shut off) the fuel shutoff valve 12 (S13) and may be configured to determine failure diagnosis target pressure from the atmospheric pressure sensed by the atmospheric sensor 34 (S14).

Next, the controller 1 may be configured to control opening of the fuel supply valve 13 such that the stack anode-side pressure reaches the determined failure diagnosis target pressure with the fuel shutoff valve 12 closed. In this case, the hydrogen remaining in the hydrogen supply channel comprising the hydrogen supply line 11 and the recirculation line 18 may be used to control the stack anode-side pressure to the failure diagnosis target pressure, and for this purpose, opening of the fuel supply valve 13 may be controlled.

In the present disclosure, the stack anode-side pressure may be pressure that is sensed by the stack inlet pressure sensor 15. The failure diagnosis target pressure in the controller 1 may be determined as the sum of the sensing value (sensed atmospheric pressure) of the atmospheric pressure sensor 34 and a predetermined set value a, as in the following Equation 1.

(failure diagnoses target pressure)=(sensed atmospheric pressure)+(set value α)  Equation 1

In the present disclosure, the set value a may be determined in advance through a text based on the amount of hydrogen remaining in a pipe after the fuel shutoff valve 12 is closed, and may be determined through the test and then stored in the controller.

Further, in an exemplary embodiment of the present disclosure, the set value a may be a constant that is set as a fixed value in the controller 1. Alternatively, the set value a may be a variable value that is determined in accordance with the operation state of the fuel cell system rather than a fixed value. That is, control pressure to be higher than the atmospheric pressure by the set value a corresponds to increasing pressure using hydrogen remaining in the hydrogen supply channel, so the set value a may be determined in the controller 1 as a value according to just-prior operation pressure or the amount of remaining hydrogen.

The juts-prior operation pressure may be anode-side pressure of the fuel cell stack 10 that is sensed by the stack inlet pressure sensor 15. The amount of remaining hydrogen is a value that depends on the sensed anode-side pressure and may be determined from the sensed anode-side pressure by a map. The set value a may be determined from the just-prior operation pressure or the amount of remaining hydrogen by a map.

As described above, the controller 1 may be configured to close the fuel shutoff valve 12 and then may be configured to control opening of the fuel supply valve 13 such that the stack anode-side pressure follows the failure diagnosis target pressure, in which the failure diagnosis target pressure is determined, as described above, by adding the set value a to the atmospheric pressure.

In the present disclosure, the stack anode-side pressure may be a real-time sensing value of the stack inlet pressure sensor installed in the anode inlet-side hydrogen supply line of the fuel cell stack, as described above, but may be a calculation value that is obtained by predetermined calculation and estimation methods from information (sensor information) collected from a fuel cell vehicle.

The controller 1 may be configured to check whether the stack anode-side pressure, sensed by the stack inlet pressure sensor 15, becomes the same as the failure diagnosis target pressure (S15). When the anode-side pressure becomes the same as the failure diagnosis target pressure, there is a difference by the set value a between the anode-side pressure and the atmospheric pressure sensed by the atmospheric sensor 34 and the set value a is the pressure difference between the anode-side pressure and the atmospheric pressure. Further, the pressure difference is a discharge pressure difference that enables water and gas to be discharged through the integrated discharge valve when the integrated discharge valve 32 is opened.

In short, opening of the fuel supply valve 13 may be controlled such that the stack anode-side pressure has a pressure difference by the set value a from the atmospheric pressure (follows the failure diagnosis target pressure) in the failure diagnosis mode. When the anode-side pressure becomes the same as the failure diagnosis target pressure (finishes following the failure diagnosis target pressure), the pressure difference between the stack anode-side pressure sensed by the stack inlet pressure sensor 15 and the atmospheric pressure sensed by the atmospheric pressure sensor 14, that is, the discharge pressure difference, becomes the set value a.

After the anode-side pressure finishes following the failure diagnosis target pressure, in order that the stack anode-side pressure sensed by the stack inlet pressure sensor 15 equilibrates with the atmospheric pressure sensed by the atmospheric sensor 34, the controller 1 may be configured to output a control instruction, that is, an opening instruction to open the integrated discharge valve 32 and starts counting time $t_{real}$ from the point in time of controlling for opening (S16).

When the controller 1 outputs the opening instruction, the integrated discharge valve 32 may be configured to operate to open the internal passage thereof in accordance with the opening instruction output from the controller 1. If the integrated discharge valve 32 is a normal state, the integrated discharge valve 32 may be configured to open in accordance with the opening instruction. However, when the integrated discharge valve 32 is closed in the closed-stuck failure state, the integrated discharge valve 32 may not be opened even through the controller 1 outputs the opening instruction.

If the integrated discharge valve 32 is actually opened without failure, the stack anode-side channel is exposed to the atmospheric pressure after the water in the water trap 31 is completely discharged, so the anode-side pressure and the atmospheric pressure that are sensed by the two sensors 15 and 34 will be finally the same under the assumption that the stack inlet sensor 15 and the atmospheric pressure sensor 34 are not offset. However, if the integrated discharge valve 32 is not actually opened, the sensed anode-side pressure and the atmospheric pressure cannot be the same.

Accordingly, in the present disclosure, it is possible to diagnose the closed-stuck failure state in which the integrated discharge valve 32 keeps closed without opening through the process of checking whether the sensing value of the stack inlet pressure sensor 15 and the sensing value of the atmospheric pressure sensor 34 after the integrated discharge valve 32 is opened.

Further, the controller 1 may be configured to count the time $t_{real}$ after the point in time of opening the integrated discharge valve 32, that is, the point in time of outputting the control instruction for opening, and then determines a drain completion time $t_{ref}$ and may be configured to determine a stabilization time x of the anode-side pressure after the water is discharged on the basis of the water level in the water trap 31 under the condition of fixed pressure difference (S17). In this case, the controller 1 may be configured to determine the drain completion time $t_{ref}$ corresponding to the water level in the water trap 31 using set data that are input and stored in advance.

The water level in the water trap 31 may be a value that is sensed by the water level sensor 33 or may be a value that is estimated from the operation state information of the fuel cell system. In the system that is provided with the information of a water level in the water trap, as described above, the drain completion time $t_{ref}$ according to the current water level in the water trap may be determined using the information of a water level in the water trap.

Since water is discharged first for the structure of the integrated discharge valve 32, it may be required to set a drain completion determination reference and the drain completion time $t_{ref}$ may be used as the reference. Factors that influence the drain completion time $t_{ref}$ is the discharge pressure difference a and the water level in the water trap, and the drain completion time needs to be experimentally determined as a value considering the discharge pressure difference a and the water level in the water trap in fuel cell systems having the same specifications.

The set data may be obtained from resultant data acquired through prior evaluation and tests based on the pressure difference a on the fuel cell system. It may be possible to determine a drain completion time tin the set data by determining the time for which water finishes being drained when the integrated discharge valve is opened for each water level in the water trap in fuel cell systems having the same specifications through prior evaluation and tests and then tuning and calibrating the determined values. The set data may be a map or a table in which the correlation between the water level in the water trap and the drain completion time $t_{ref}$ may be determined.

In a system that does not have the information of a water level in the water trap 31, the drain completion time $t_{ref}$ may be a constant set in advance in the controller 1. The drain completion time $t_{ref}$ that may be defined as a constant may be set in the controller 1 as a value when the water trap is fully filled with water that is obtained through the prior evaluation and tests under the condition of the applied difference pressure α, that is, as a time for which water is completely drained when the water trap is fully filled.

After the drain completion time $t_{ref}$ is determined, as described above, the controller 1 may be configured to determine a failure diagnosis reference time to additionally using a time that the anode-side pressure takes to be stabilized to the atmospheric pressure after the drain completion time passes, that is, the stabilization time x of the anode-side pressure together with the determined drain completion time $t_{ref}$.

The stabilization time x of the anode-side pressure that is the time that the anode-side pressure takes to be stabilized to the atmospheric pressure after water may be discharged from the current water level in the water trap may be a constant set in advance in the controller 1, and the constant may be a calibration value that is determined through a prior test under the condition of the applied discharge pressure difference a.

After the drain completion time $t_{ref}$ and the stabilization time x of the anode-side pressure are determined, the controller 1 may be configured to determine the failure diagnosis reference time as the sum of the drain completion time $t_{ref}$ and the stabilization time x of the anode-side pressure ($t_d = t_{ref} + x$).

After the failure diagnosis reference time $t_d$ is determined, the controller 1 may be configured to determine whether the integrated discharge valve 32 fails using the determined failure diagnosis reference time $t_d$, real-time anode-side pressure information, and real-time atmospheric pressure information.

That is, first, the controller 1 may be configured to determine whether the time $t_{real}$ counted from the point in time of outputting an opening instruction 'Open' for opening the integrated discharge valve 32 exceeds the failure diagnosis reference time ($t_d = t_{ref} + x$) (S18).

If the time $t_{real}$ counted from the point in time of outputting an opening instruction 'Open' for opening the integrated discharge valve 32 exceeds the failure diagnosis reference time ($t_d = t_{ref} + x$) ($t_{real} > t_d$), the controller 1 may be configured to compare the anode-side pressure and the atmospheric pressure sensed by the sensors 15 and 34 (S19). When the anode-side pressure is larger than the atmospheric pressure, the controller 1 may be configured to determine that the integrated discharge valve 32 in a failure state in which it keeps closed without opening (S20), and shuts down the fuel cell system (S21).

On the other hand, when the anode-side pressure is not larger than the atmospheric pressure, for example, when the anode-side pressure is the same as the atmospheric pressure, the controller 1 may be configured to determine that the integrated discharge valve 32 has been normally opened, and may be configured to determine that the integrated discharge valve 32 is in the normal state rather than the failure state (S21). When the integrated discharge valve 32 is in the normal state, as described above, the fuel cell system may be normally operated.

Figure 5:
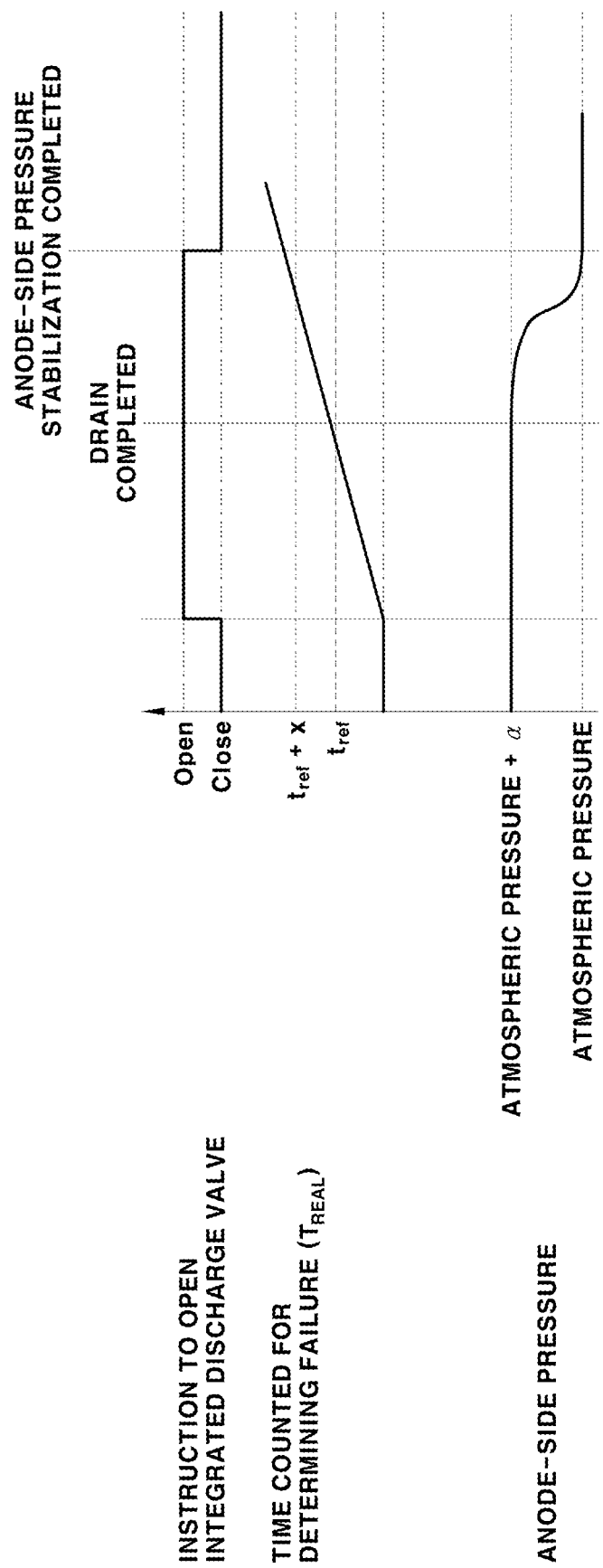
FIGS. 5 and 6 are diagrams comparing anode-side pressure states of a stack, depending on whether an integrated discharge valve fails.
Figure 6:
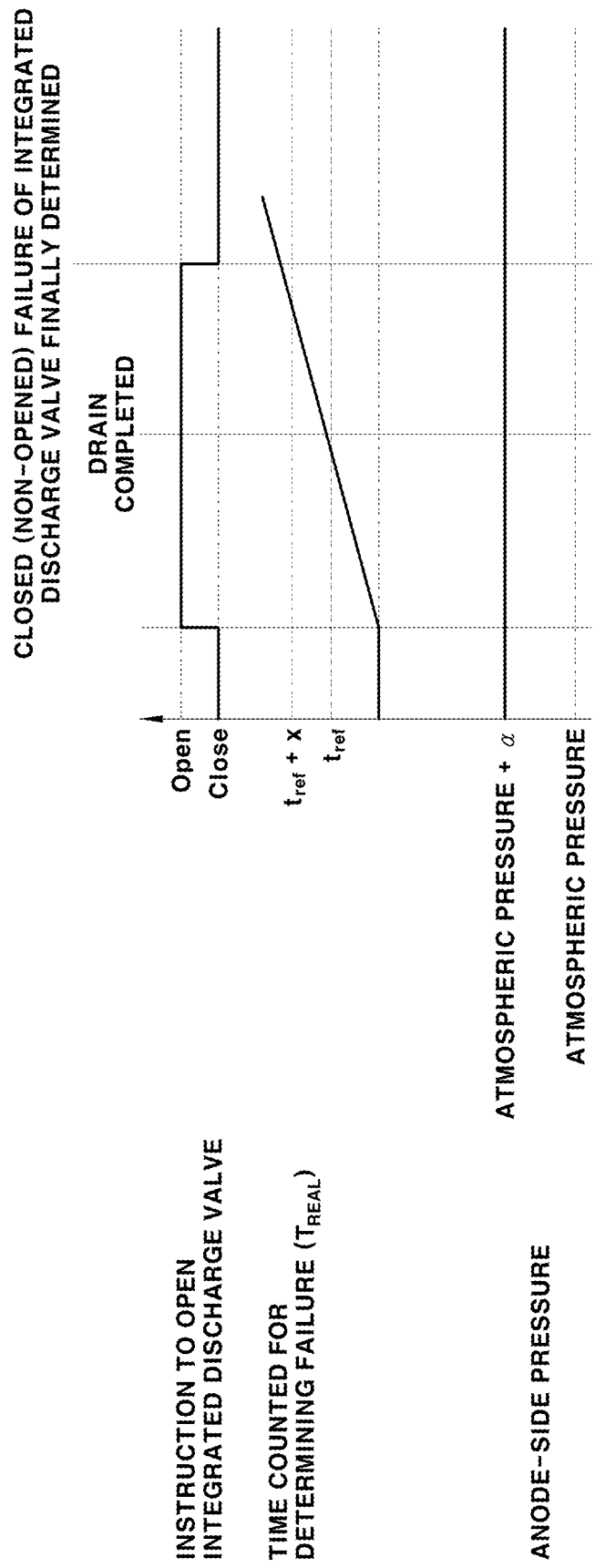

FIGS. 5 and 6 are diagrams comparing stack anode-side pressure states, depending on whether an integrated discharge valve fails. FIG. 5 shows stack anode-side pressure after the integrated discharge valve is opened when the integrated discharge valve is in the normal state, and FIG. 6 shows stack anode-side pressure after the integrated discharge valve is opened when the integrated discharge valve is in a failure state in which it keeps closed without opening.

Referring to FIG. 5, when controlling the stack anode-side pressure to the failure diagnosis target pressure (atmospheric pressure+α) and then outputting an opening instruction 'Open' to open the integrated discharge valve 32, the controller 1 may be configured to count a time $t_{real}$ from the point in time of opening control and checks whether the time from the point in time of opening control exceeds the sum of the drain completion time $t_{ref}$ and the stabilization time x of the anode-side pressure.

If the integrated discharge valve 32 has been normally opened without failure in accordance with the opening instruction from the controller 1, when the failure diagnosis reference time ($t_d = t_{ref} + x$) passes, the hydrogen supply channel connected to the anode of the fuel cell stack 10 may be completely exposed to the atmospheric pressure, and the discharge pressure difference a may be completely removed in an exposure completion state in which the stack anode-side pressure drops to the atmospheric pressure.

However, when the integrated discharge valve 32 is in the closed-stuck failure state in which it keeps closed without opening even though the opening instruction 'Open' is output from the controller 1, the hydrogen supply channel connected to the anode of the fuel cell stack 10 may not be exposed to the atmospheric pressure even though the failure diagnosis reference time ($t_d = t_{ref} + x$) passes, so, as shown in FIG. 6, the stack anode-side pressure is maintained at the failure diagnosis target pressure (atmospheric pressure+α).

Accordingly, when the stack anode-side pressure is maintained at the previous pressure rather than the atmospheric pressure even after the integrated discharge valve 32 is opened, it may be possible to finally determine that the integrated discharge valve is in the closed-stuck failure state. After determining that the integrated discharge valve 32 is in a failure state, the controller may be configured to shut down the fuel cell system after outputting a closing instruction 'Close' for the integrated discharge valve.

It may be possible to determine that the integrated discharge valve is in the normal state when the anode-side pressure is the same as the atmospheric pressure as the result of checking the anode-side pressure after the failure diagnosis reference time passes, and it may be possible to finally determine that the integrated discharge valve is in a failure state when the anode-side pressure is maintained at the failure diagnosis target pressure without dropping to the atmospheric pressure.

The failure diagnosis method according to the present disclosure was described in detail above. In the related art, since only a possible failure state of a valve is determined on the basis of an anode-side gas discharge amount (purge amount) of a fuel cell stack and a fuel cell system is shut down, it is difficult to avoid reduction of the power performance and an operation impossibility situation of a vehicle.

However, in the present disclosure, since it is possible to accurately diagnose a valve stuck failure, it is possible to shut down the fuel cell system only when failure is definitely determined, and accordingly, it is possible to prevent anode gas discharge amount of a vehicle and secure driving stability.

Further, when a position sensor or a current sensor for sensing whether a valve is opened or closed, there is a high possibility of wrong diagnosis due to low reliability of the sensors. However, in the present disclosure, since a position sensor or a current sensor is not used, there is an effect that it is possible to avoid the possibility of wrong diagnosis and to reduce the manufacturing cost.

Although embodiments of the present disclosure were described above in detail, the spirit of the present disclosure is not limited thereto and the present disclosure may be changed and modified in various ways on the basis of the basic concept without departing from the scope of the present disclosure described in the following claims.

What is claimed is:

1. A method for diagnosing valve failure of a fuel cell system, the method comprising:
by a controller:
determining a failure diagnosis target pressure from atmospheric pressure that is a real-time sensing value of an atmospheric sensor;
opening of a fuel supply valve installed in a hydrogen supply line to enable a stack anode-side pressure to reach the failure diagnosis target pressure;
opening an integrated discharge valve installed at a water trap when the stack anode-side pressure reaches the failure diagnosis target pressure;
counting a time passed after the opening; and
determining whether the integrated discharge valve fails based on the time, the stack anode-side pressure, and the atmospheric pressure.

2. The method of claim 1, further comprising, by the controller:
determining whether a preset failure diagnosis entrance condition is satisfied from current operation state information of a fuel cell system; and
when the failure diagnoses entrance condition is satisfied, determining the failure diagnosis target pressure.

3. The method of claim 2, wherein:
the failure diagnosis entrance condition is a condition in which only hydrogen is supplied to an anode of a fuel cell stack without current output from the fuel cell stack, and
the failure diagnosis entrance condition comprises one or more of:
a state wherein the fuel cell system has started but air is not yet supplied to the fuel cell stack;
a state wherein the fuel cell system has stopped and air supply to the fuel cell stack has been blocked;
a state wherein air supply to the fuel cell stack has stopped when having entered a fuel cell stop; and
a state wherein air is not yet supplied to the fuel cell stack when having exited the fuel cell stop.

4. The method of claim 2, further comprising, by the controller:
when determining that the failure diagnosis entrance condition is satisfied, checking whether an air shutoff valve, installed in a cathode inlet-side air supply lien of a fuel cell stack, and a cathode outlet-side exhaust line of the fuel cell stack are closed; and
when an air supply line and the exhaust line are closed by the air shutoff valve, determining the failure diagnosis target pressure.

5. The method of claim 2, wherein determining of the failure diagnosis target pressure further comprises determining the failure diagnosis target pressure as a sum of the atmospheric pressure and a preset set value.

6. The method of claim 5, wherein the preset set value is a value determined as a constant through a test and stored in the controller.

7. The method of claim 5, wherein the determining the failure diagnosis target pressure further comprises:
determining the preset set value in advance through a test and as a value according to the stack anode-side pressure.

8. The method of claim 1, wherein the determining whether the integrated discharge valve fails further comprises:
determining a drain completion time according to a current water level in a water trap, based on information of a water level in the water trap under a condition of a fixed pressure difference;
determining a failure diagnosis reference time based on the drain completion time and a preset post-drain anode-side pressure stabilization time;
determining whether the time passed after the opening exceeds the failure diagnosis reference time; and
when the time passed after the opening exceeds the failure diagnosis reference time, determining whether the integrated discharge valve fails by comparing the stack anode-side pressure and atmospheric pressure.

9. The method of claim 8, further comprising, by the controller, determining a drain completion time corresponding to a current water level in the water trap from a map or a table corresponding to set data that are input and stored in advance.

10. The method of claim 8, wherein the determining the failure diagnosis reference time further comprises determining the failure diagnosis reference time as a sum of the drain completion time and the post-drain anode-side pressure stabilization time.

11. The method of claim 8, wherein the determining whether the integrated discharge valve fails further comprises determining whether the integrated discharge valve is in a closed-stuck failure state wherein the integrated discharge valve keeps closed without opening when the stack anode-side pressure is larger than atmospheric pressure.

12. The method of claim 8, wherein the determining whether the integrated discharge valve fails further comprises determining that the integrated discharge valve is in a normal state when the stack anode-side pressure is the same as the atmospheric pressure.

13. The method of claim 1, wherein the determining whether the integrated discharge valve fails comprises:
determining a failure diagnosis reference time from a drain completion time, which is set in advance as a constant, and a post-drain anode-side pressure stabilization time;
determining whether the time after the opening exceeds the failure diagnosis reference time; and
when the time after the opening exceeds the failure diagnosis reference time, determining whether the integrated discharge valve fails by comparing the stack anode-side pressure and atmospheric pressure.

14. The method of claim 13, wherein the determining the failure diagnosis reference time further comprises determining the failure diagnosis reference time as a sum of the drain completion time and the post-drain anode-side pressure stabilization time.

15. The method of claim 13, wherein the determining whether the integrated discharge valve fails further comprises, when the stack anode-side pressure is larger than the atmospheric pressure, determining that the integrated discharge valve is in a closed-stuck failure state in which the integrated discharge valve keeps closed without opening.

16. The method of claim 13, wherein the determining whether the integrated discharge valve fails further comprises, when the stack anode-side pressure is the same as atmospheric pressure, determining that the integrated discharge valve is in a normal state.

* * * * *